(12) United States Patent
Foege

(10) Patent No.: US 8,925,465 B2
(45) Date of Patent: Jan. 6, 2015

(54) CONSIST HAVING SELF-PROPELLED TENDER CAR

(75) Inventor: Aaron Gamache Foege, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 234 days.

(21) Appl. No.: 13/563,114

(22) Filed: Jul. 31, 2012

(65) Prior Publication Data

US 2014/0033942 A1 Feb. 6, 2014

(51) Int. Cl.
*B61D 17/00* (2006.01)

(52) U.S. Cl.
USPC .......................................... 105/1.4; 104/287

(58) Field of Classification Search
USPC ........... 105/1.4, 231, 236; 104/287, 288, 289; 246/187 A
See application file for complete search history.

(56) References Cited

U.S. PATENT DOCUMENTS

| | | | |
|---|---|---|---|
| 308,948 A | 12/1884 | Bruce | |
| 331,716 A | 12/1885 | Katz | |
| 338,028 A | 3/1886 | Bower | |
| 3,352,294 A | 11/1967 | Biller et al. | |
| 4,137,006 A | 1/1979 | Becker | |
| 4,551,065 A | 11/1985 | Becker | |
| 4,630,572 A | 12/1986 | Evans | |
| 4,646,701 A | 3/1987 | Fukumoto | |
| 5,129,328 A | 7/1992 | Donnelly | |
| 5,269,225 A | 12/1993 | Bosshart et al. | |
| 5,375,580 A | 12/1994 | Stolz et al. | |
| 5,544,483 A | 8/1996 | Heuer | |
| 5,567,105 A | 10/1996 | Williams | |
| 5,609,141 A | 3/1997 | Matsuoka et al. | |
| 5,692,458 A | 12/1997 | Green | |
| 5,887,567 A | 3/1999 | White et al. | |
| 6,408,766 B1 * | 6/2002 | McLaughlin et al. | 105/231 |
| 6,460,517 B1 | 10/2002 | Dauer | |
| 6,506,018 B1 | 1/2003 | Brennan | |
| 6,615,118 B2 * | 9/2003 | Kumar | 701/19 |
| 6,698,211 B2 | 3/2004 | Gustafson | |
| 6,898,940 B2 | 5/2005 | Gram et al. | |
| 6,907,735 B2 | 6/2005 | Wolff et al. | |

(Continued)

FOREIGN PATENT DOCUMENTS

| | | |
|---|---|---|
| CH | 1 261 237 | 3/1969 |
| DE | 102009042256 | 4/2011 |

(Continued)

OTHER PUBLICATIONS

Foege, "Consist Having Self-Powered Tender Car", U.S. Appl. No. 13/563,154 dated Jul. 31, 2012.

(Continued)

*Primary Examiner* — Jason C Smith
(74) *Attorney, Agent, or Firm* — Finnegan, Henderson, Farabow, Garrett & Dunner LLP

(57) ABSTRACT

The disclosure is directed to a tender car for a consist. The tender car may have a frame, a truck configured to support the frame, and a fuel tank mounted to the frame. The tender car may also have a wheel rotatably connected to the truck, and a motor operatively connected to the wheel and configured to drive the wheel. The tender car may further have a power supply configured to power the motor when the tender car is decoupled from the consist.

17 Claims, 3 Drawing Sheets

(56) References Cited

U.S. PATENT DOCUMENTS

| | | |
|---|---|---|
| 7,231,877 B2 | 6/2007 | Kumar |
| 7,304,445 B2 | 12/2007 | Donnelly |
| 7,308,889 B2 | 12/2007 | Post et al. |
| 7,373,931 B2 | 5/2008 | Lennox et al. |
| 7,430,967 B2 * | 10/2008 | Kumar ............................ 105/35 |
| 7,448,328 B2 | 11/2008 | Kumar |
| 7,631,635 B2 | 12/2009 | Hochstein et al. |
| 7,689,341 B2 | 3/2010 | Miller |
| 7,765,859 B2 * | 8/2010 | Connell et al. ................... 73/121 |
| 8,056,540 B2 | 11/2011 | Debastos et al. |
| 8,079,437 B2 | 12/2011 | Rosman |
| 8,112,191 B2 * | 2/2012 | Kumar et al. ..................... 701/22 |
| 2004/0149254 A1 | 8/2004 | Piock |
| 2005/0279242 A1 * | 12/2005 | Maier et al. ................ 105/26.05 |
| 2006/0005736 A1 * | 1/2006 | Kumar ............................ 105/1.4 |
| 2008/0000381 A1 | 1/2008 | Bartley et al. |
| 2008/0083576 A1 | 4/2008 | Read |
| 2008/0121136 A1 | 5/2008 | Mari et al. |
| 2008/0302093 A1 | 12/2008 | Montgomery et al. |
| 2009/0187291 A1 | 7/2009 | Daum et al. |
| 2009/0234521 A1 * | 9/2009 | Kumar et al. ..................... 701/19 |
| 2010/0019103 A1 * | 1/2010 | Kane et al. ..................... 246/186 |
| 2010/0070117 A1 | 3/2010 | Siffert |
| 2010/0114404 A1 | 5/2010 | Donnelly |
| 2010/0175579 A1 * | 7/2010 | Read ............................ 105/1.4 |
| 2010/0186619 A1 * | 7/2010 | Kumar .......................... 104/289 |
| 2011/0061364 A1 | 3/2011 | Raman |
| 2011/0067390 A1 | 3/2011 | Cook |
| 2011/0162903 A1 | 7/2011 | Stragier |
| 2011/0203480 A1 | 8/2011 | Donnelly |
| 2011/0257869 A1 * | 10/2011 | Kumar et al. ................. 701/103 |
| 2012/0085260 A1 | 4/2012 | Nichini et al. |
| 2014/0033941 A1 * | 2/2014 | Foege et al. ..................... 105/1.4 |
| 2014/0033942 A1 * | 2/2014 | Foege ............................ 105/1.4 |
| 2014/0033943 A1 * | 2/2014 | Foege et al. ..................... 105/1.4 |
| 2014/0033944 A1 * | 2/2014 | Foege ............................ 105/1.4 |

FOREIGN PATENT DOCUMENTS

| | | |
|---|---|---|
| EP | 0 069 717 | 12/1983 |
| EP | 2 154 044 A2 | 2/2010 |
| EP | 2 154 044 B1 | 1/2012 |
| JP | 56 118533 | 9/1981 |
| JP | 6 033 784 | 2/1994 |
| JP | 2000 136756 | 5/2000 |
| JP | 2007 113442 | 5/2007 |
| JP | 2008 201890 | 9/2008 |
| JP | 2010 023776 | 2/2010 |
| RU | 2009142173 | 5/2011 |
| WO | WO 2008/025158 | 3/2008 |
| WO | WO 2008/037571 | 4/2008 |
| WO | WO 2009/021262 | 2/2009 |
| WO | WO 2010/012252 | 2/2010 |

OTHER PUBLICATIONS

Foege, "Fuel System for Consist Having Daughter Locomotive", U.S. Appl. No. 13/562,242 dated Jul. 31, 2012.

Foege, "Energy Recovery System for a Mobile Machine", U.S. Appl. No. 13/563,414 dated Jul. 31, 2012.

Foege et al, "Energy Recovery System for a Mobile Machine", U.S. Appl. No. 13/562,808 dated Jul. 31, 2012.

Foege et al., "Fuel Distribution System for Multi-Locomotive Consist", U.S. Appl. No. 13/563,220 dated Jul. 31, 2012.

Coldren et al., "Consist Power System Having Auxiliary Load Management", U.S. Appl. No. 61/677,770 dated Jul. 31, 2012.

* cited by examiner

CONSIST HAVING SELF-PROPELLED TENDER CAR

TECHNICAL FIELD

The present disclosure relates generally to a consist and, more particularly, to a consist having a tender car capable of propelling itself when disconnected from the rest of the consist.

BACKGROUND

Natural gas has been used as fuel for internal combustion engines in consist locomotives. Because natural gas has a lower volumetric energy density than traditional fuels, such as diesel and gasoline, the natural gas used by the locomotives is generally only practical to store in a liquefied state ("LNG"). At atmospheric pressures, the natural gas must be chilled to below about −160° C. to remain in liquid form. Consists having LNG-fueled locomotives store the LNG in insulated tank cars (a.k.a., tender cars) that are towed by the locomotive.

In order to be utilized as an effective engine fuel, liquefied natural gas requires more energy than a liquid counterpart to be stored, compressed, vaporized and transported within a train consist. This relatively greater amount of energy required to power ancillary equipment is typically drawn from the power output of the consist's main engine. The additional consumption of power results in undesirable consequences with regards to fuel and engine power efficiencies.

One method of improving fuel economy in a consist is described in U.S. Pat. No. 6,408,766 ("the '766 patent") of McLaughlin that issued on Jun. 25, 2002. The '766 patent describes a tender car having the capacity to augment tractive forces of an associated locomotive on a consist by utilizing traction motors located onboard the tender car. The energy utilized to power the traction motors on a tender car is produced by the locomotive. By augmenting the propulsion of the locomotive, the tender car reduces the tractive load placed on the locomotive.

Although the system of the '766 patent may be capable of reducing the tractive load of a consist, it only provides benefit when the tender car is actively coupled with and being powered by the locomotive.

The tender car of the present disclosure solves one or more of the problems set forth above and/or other problems with existing technologies.

SUMMARY

In one aspect, the disclosure is directed to a tender car for a consist. The tender car may include a frame, a truck configured to support the frame, and a fuel tank mounted to the frame. The tender car may also include a wheel rotatably connected to the truck, and a motor operatively connected to the wheel and configured to drive the wheel. The tender car may include a power supply configured to power the motor when the tender car is decoupled from the consist.

In another aspect, the disclosure is directed to a method of propelling a tender car. The method may include generating a supply of electric power. The method may further include selectively directing the electric power from the supply to a motor on the tender car to propel the motor car when the tender car is decoupled from the consist.

DETAILED DESCRIPTION

Figure 1:
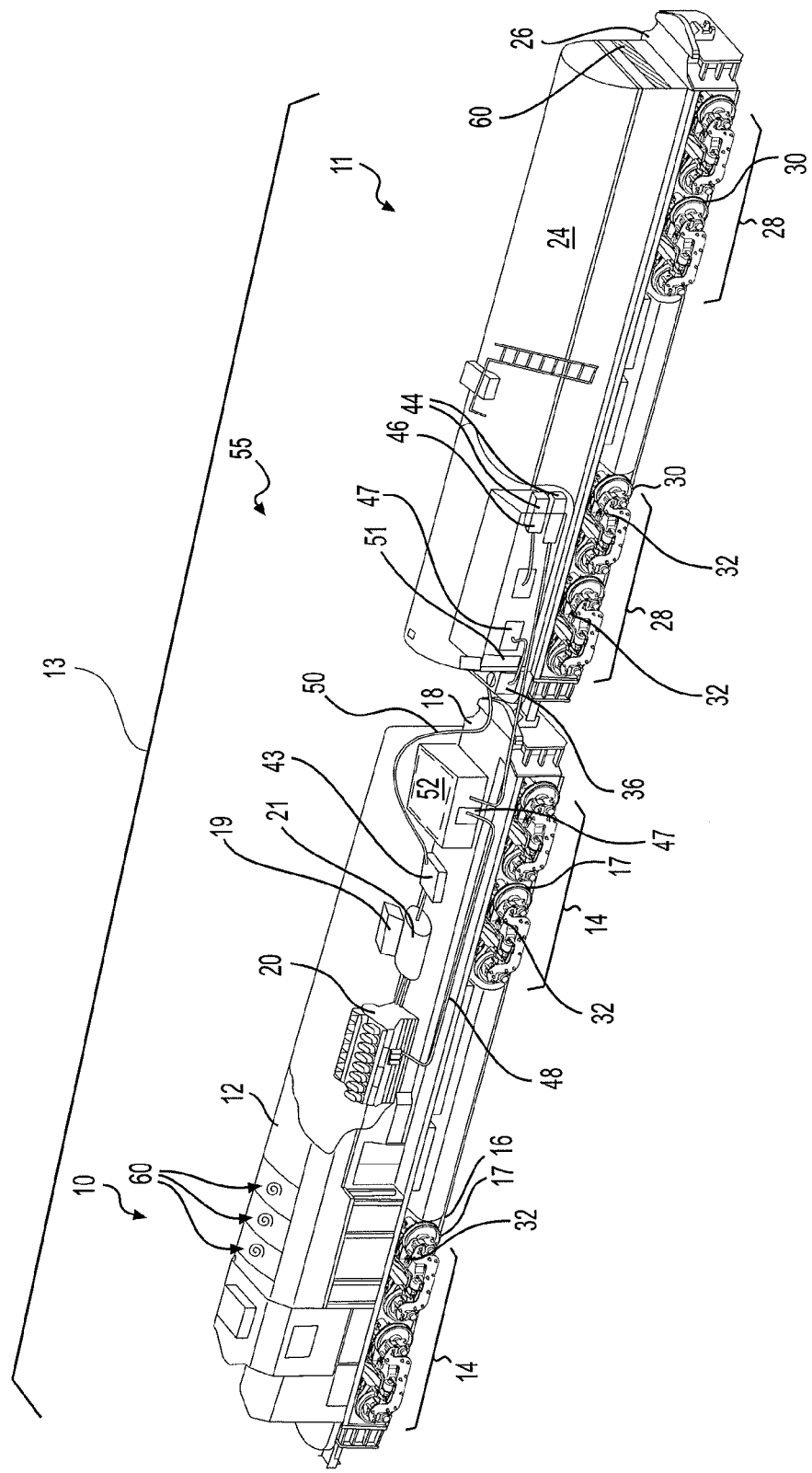
FIG. 1 is a pictorial illustration of an exemplary disclosed consist.

FIG. 1 illustrates an exemplary embodiment of a locomotive 10 and a tender car 11 that is towed by locomotive 10. In some embodiments, additional cars may be towed by locomotive 10, for example, a passenger car (not shown), a cargo container car (not shown), or another type of car. Together, locomotive 10, tender car 11 and the other cars connected to them may comprise a consist 13.

Locomotive 10 may include a car body 12 supported at opposing ends by a plurality of trucks 14 (e.g., two trucks 14). Each truck 14 may be configured to engage a track 16 via a plurality of wheels 17, and support a frame 18 of car body 12. Any number of main engines 20 may be mounted to frame 18 and configured to produce electricity that drives wheels 17 included within each truck 14. In the exemplary embodiment shown in FIG. 1, locomotive 10 includes one main engine 20.

Main engine 20 may be a large engine, for example an engine having sixteen cylinders and a rated power output of about 4,000 brake horsepower (bhp). Main engine 20 may be configured to combust a gaseous fuel, such as natural gas, and generate a mechanical output that drives a main generator 21 to produce electric power. The electric power from main generator 21 may be used to propel locomotive 10 via one or more traction motors 32 associated with wheels 17 and, in some instances, directed to one or more auxiliary loads 43 of consist 13 (e.g., lights, heaters, refrigeration devices, air conditioners, fans, etc.). A switch 23 (shown only in FIG. 2) positioned on locomotive 10 may selectively connect main generator 21 to both traction motors 32 and auxiliary loads 43, to only traction motors 32, or to only auxiliary loads 43. Consequently, electric power from main generator 21 may be shared or dedicated solely to propulsion or auxiliary loads, as desired. It should be noted that main engine 20 may have a different number of cylinders, a different rated power output, and/or be capable of combusting another type of fuel, if desired.

Main generator 21 may be an induction generator, a permanent-magnet generator, a synchronous generator, or a switched-reluctance. In one embodiment, main generator 21 may include multiple pairings of poles (not shown), each pairing having three phases arranged on a circumference of a stator (not shown) to produce an alternating current.

Traction motors 32, in addition to providing the propelling force of consist 13 when supplied with electric power, may also function to slow locomotive 10. This process is known in the art as dynamic braking. When a traction motor 32 is not needed to provide motivating force, it can be reconfigured to operate as a generator. As such, traction motors 32 may convert the kinetic energy of consist 13 into electric power, which has the effect of slowing consist 13. The electric power generated during dynamic braking is typically transferred to one or more resistance grids 60 mounted on car body 12. At resistance grids 60, the electric power generated during dynamic braking is converted to heat and dissipated into the atmosphere. Alternatively or additionally, electric power generated from dynamic braking may be routed to an energy storage system 19 used to selectively provide supplemental power to traction motors 32.

Tender car 11 may be provided with an auxiliary engine 36 that is mechanically connected to an auxiliary generator 38

Figure 2:
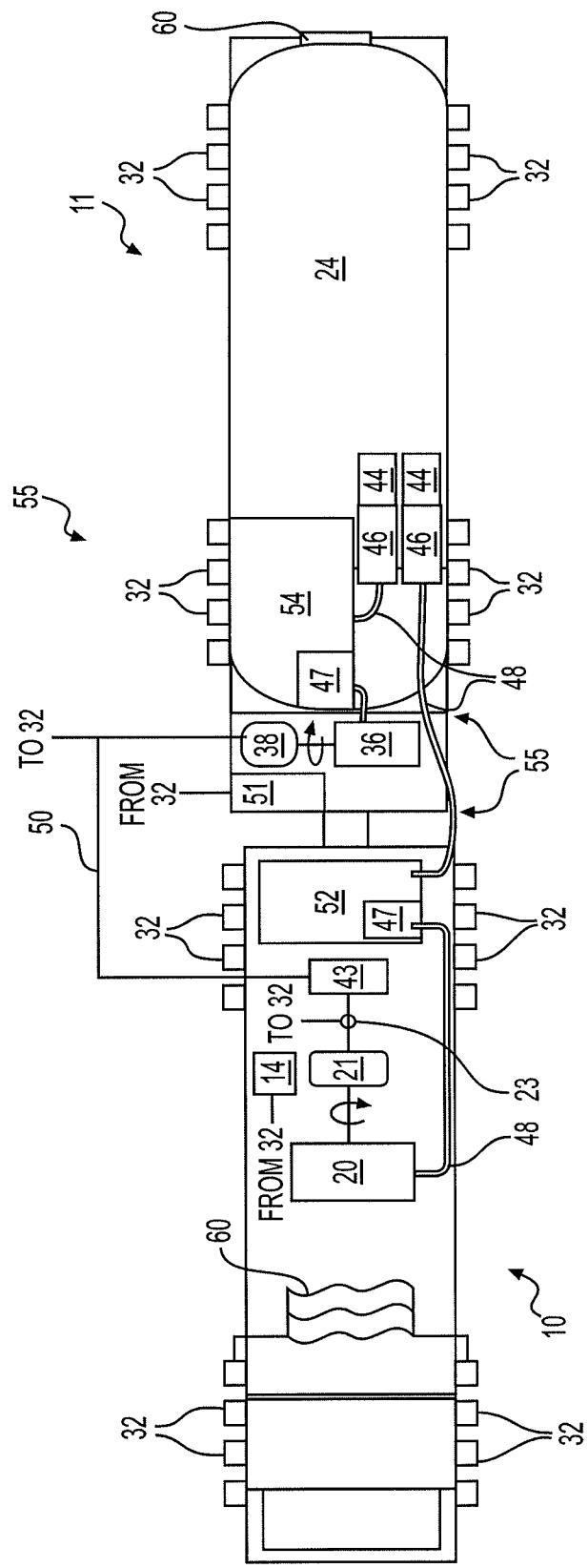
FIG. 2 is a top-view diagrammatic illustration of the consist displayed in FIG. 1.

(shown only in FIG. 2). Auxiliary engine 36 and auxiliary generator 38 may be mounted to a frame 26 that is supported by a plurality of trucks 28. Similar to truck 14, each truck 28 may be configured to engage track 16 via a plurality of wheels 30.

Auxiliary engine 36 may be smaller and have a lower rated output than main engine 20. For example, auxiliary engine 36 may have six to twelve cylinders and a rated power output of about 400-1400 bhp. It should be noted, however, that engines with a different number of cylinders or rated power output may alternatively be utilized, if desired. Similar to main engine 20, auxiliary engine 36 may combust natural gas or another type of gaseous fuel to generate a mechanical output used to rotate auxiliary generator 38. Auxiliary generator 38 may produce an auxiliary supply of electric power directed to one or more of the auxiliary loads 43 (i.e., loads not driven by main engine 20) of consist 13.

Auxiliary generator 38, in addition to providing electric power to auxiliary loads 43 of locomotive 10 or to the other cars of consist 13, may also provide electric power to one or more traction motors 32 on tender car 11, if desired. Similar to traction motors 32 located on locomotive 10, traction motors 32 of tender car 11 may function to propel tender car 11 by rotating wheels 30. In this manner, tender car 11 may be self-propelled and capable of moving about on its own power, independent of locomotive 10 or any other car (when uncoupled from locomotive 10 and the other cars). Additionally, tender car 11 may be capable of supplementing the tractive power of locomotive 10, if desired, while tender car 11 is coupled to locomotive 10.

Similar to locomotive 10, tender car 11 may generate its own electric power via dynamic braking via traction motors 32. The generated electric power may be stored at an electric power storage system 51 onboard tender car 11. Energy stored within system 51 may be selectively provided to traction motors 32 of tender car 11, and/or to any auxiliary load 43 of consist 13.

Auxiliary generator 38 and/or energy storage system 51 of tender car 11 may provide electric power to auxiliary loads 43 on locomotive 10 via an electric conduit 50. With this configuration, main engine 20 may be capable of shutting down or otherwise functioning at a reduced-output level and auxiliary loads 43 may continue to function normally by utilizing power provided by auxiliary generator 38.

Tender car 11 may also include one or more tanks 24 configured to store a liquid fuel (e.g., LNG) for combustion within main engine 20 and auxiliary engine 36. In the disclosed embodiment, a single tank 24 is shown. Tank 24 may be an insulated, single or multi-walled tank configured to store the liquid fuel at low temperatures, such as below about −160° C. Tanks 24 may be integral with frame 18 of tender car 11.

A fuel delivery circuit 55 may supply fuel from tank 24 to main engine 20 on locomotive 10 and to auxiliary engine 36 on tender car 11. Fuel delivery circuit 55 may include, among other things, one or more fuel pumps 44, one or more conduits 48, one or more heat exchangers 46, one or more accumulators (e.g., a main accumulator 52 and an auxiliary accumulator 54), and one or more injectors (not shown) that condition, pressurize or otherwise transport low-temperature liquid fuel, as is known in the art. Fuel delivery circuit 55 may also include one or more regulators 47 that help to regulate flow between main and auxiliary accumulators 52, 54 and engines 20, 36, respectively.

As illustrated in FIGS. 1 and 2, pumps 44 may each be situated near or within tank 24, and embody, for example, cryogenic pumps, piston pumps, centrifugal pumps, or any other pumps that are known in the industry. Pumps 44 may be powered by engines 20 and/or 36. Alternatively, pumps 44 may be powered by electric storage systems 19 and/or 51, if desired. Pumps 44 may pressurize the liquid fuel to an operating pressure of about 5,000 psi, and push the liquid fuel through heat exchangers 46 via conduits 48.

As illustrated in FIG. 1, heat exchangers 46 may have components situated near or within tank 24. Heat exchangers 46 may provide heat sufficient to vaporize the fuel as it is moved by pumps 44. Upon vaporization, the fuel may be transported via conduits 48 to, and stored at, accumulators 52, 54.

Accumulators 52, 54 on locomotive 10 and tender car 11, may be configured to receive pressurized gaseous fuel. Accumulators 52, 54 may embody, for example, compressed gas, membrane/spring, bladder-type, or other suitable accumulators configured to collect pressurized gaseous fuel and discharge the fuel to main engine 20 or auxiliary engine 36 via regulator 47.

Regulators 47 may be configured to selectively allow fluid communication between accumulators 52, 54 and main and auxiliary engines 20, 36, respectively. When regulators 47 open, they may allow gaseous fuel to escape accumulators 52, 54 and flow to main and/or auxiliary engines 20, 36. Regulators 47 may each include a spring-loaded mechanism (not shown) that opens at a predetermined pressure to avoid over-pressurization of accumulators 52, 54. Additionally or alternatively, regulators 47 may each include one or more controllable actuators, such as one or more electric solenoids that are operable to open regulator 47 when actuated.

Figure 3:
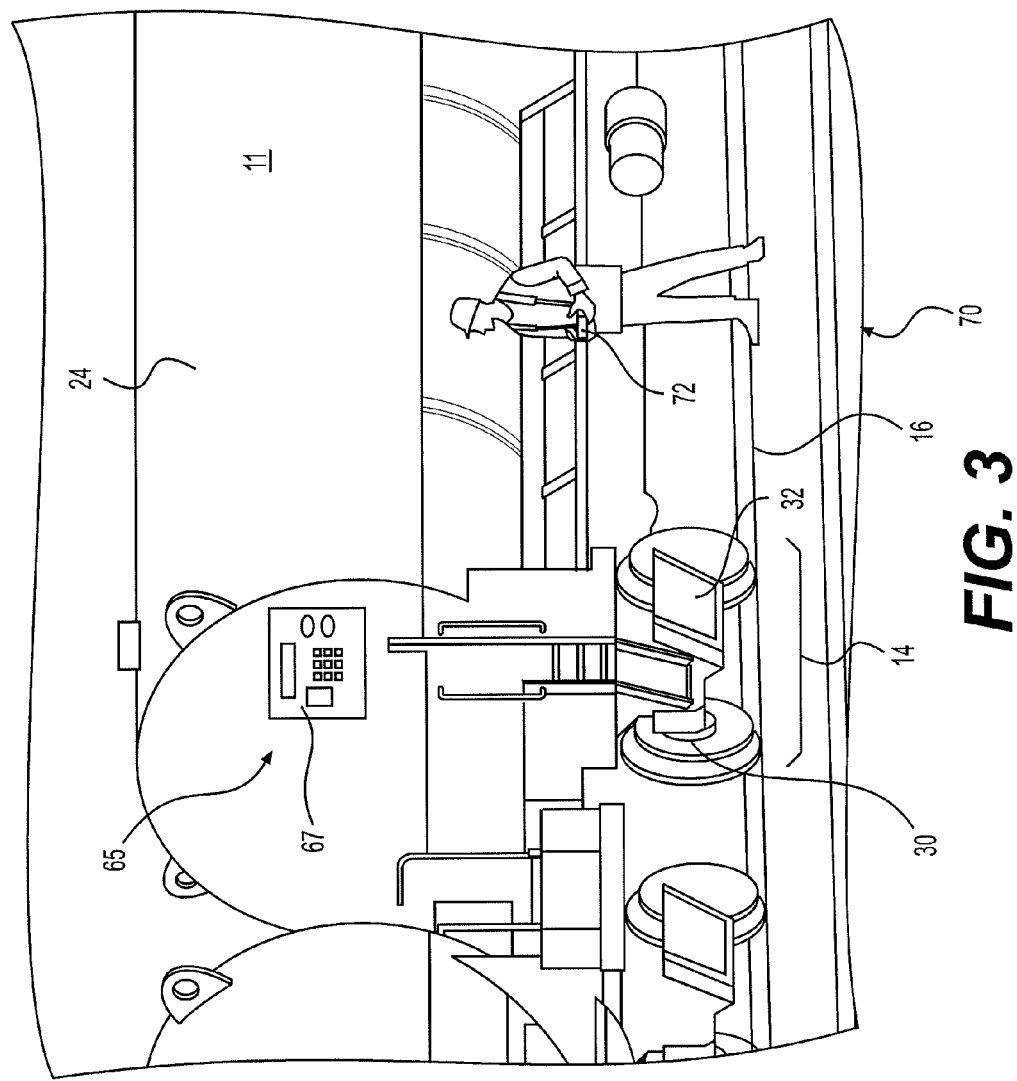
FIG. 3 is a diagrammatic illustration of an exemplary disclosed control station associated with a tender car in the consist of FIG. 1.

The self-powered operation of tender car 11 may be controlled in a number of different ways. For example, as shown in FIG. 3, an operator station 65 may be located on tender car 11 and configured to receive manual instructions regarding desired operation (e.g., acceleration, deceleration, etc.) of motors 32. In this configuration, the operator of consist 13 (or a hostler at a train yard) may be able to manipulate one or more input devices 67 associated with operator station 85 from either an onboard location or while walking along side tender car 11. Additionally or alternatively, operation of motor 32 may be remotely controlled, for example from a train yard control station and/or from a handheld controller 72 used by a hostler 70 at the train yard.

INDUSTRIAL APPLICABILITY

The disclosed tender car may be applicable to any consist 13, where tractive capacity and/or efficiency is important. The disclosed tender car may increase the tractive capacity of consist 13 via tractive motors 32 located onboard tender car 11. Efficiency of consist 13 can thereby also be improved, in that tender car 11 itself may no longer place an excessive burden on locomotive 10.

The disclosed tender car may also provide functionality when decoupled from locomotive 10. In particular, the ability of tender car 11 to propel itself when not connected to locomotive 10 may allow for enhanced mobility and control at a train yard facility. This enhanced mobility and control may improve operations at the train yard facility, reduce fueling times, and/or reduce the time required to assemble and deconstruct consist 13.

It will be apparent to those skilled in the art that various modifications and variations can be made to the disclosed tender car without departing from the scope of the disclosure. Other embodiments of the tender car will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A consist, comprising:
   a locomotive, having:
      a frame;
      a main engine mounted to the frame;
      a plurality of wheels configured to support the frame and driven by the main engine;
      a main generator driven by the main engine to generate a main supply of electric power; and
      a first traction motor configured to receive the main supply of electric power and propel the locomotive; and
   a tender car coupled with the locomotive, the tender car having:
      a tank configured to store fuel;
      an auxiliary engine;
      a fuel delivery circuit connected to the tank, the auxiliary engine, and the main engine;
      an auxiliary generator powered by the auxiliary engine to generate a supply of auxiliary electric power;
      a second motor configured to receive the auxiliary electric power and propel the tender car; and
      an energy storage system configured to store electric power generated by the second motor during dynamic braking,
   wherein the second motor is capable of propelling the tender car with stored electric power when the tender car is decoupled from the locomotive.

2. The tender car of claim 1, wherein the energy storage system is configured to store electric power during a previous operation of the tender car.

3. The tender car of claim 2, wherein the previous operation is a dynamic braking operation of the motor.

4. The tender car of claim 1, wherein the auxiliary engine is supplied with fuel from the tank.

5. The tender car of claim 1, further including an onboard operator station configured to regulate operation of the motor in response to operator input.

6. The tender car of claim 5, wherein the operator station is accessible by the operator from a position offboard the tender car.

7. The tender car of claim 1, wherein the motor is remotely controlled from a train yard control station.

8. The tender car of claim 1, wherein the motor is also configured to receive electric power from the consist when the tender car is coupled with the consist.

9. The tender car of claim 8, wherein the motor is further configured to rotate the wheel to supplement tractive power from a locomotive of the consist when the tender car is coupled with the consist.

10. A method of propelling a tender car coupled to a locomotive, comprising:
    generating a supply of electric power, wherein generating the supply of electric power includes operating an auxiliary engine on the tender car to drive an auxiliary generator on the tender car; and
    selectively directing the electric power from the supply to a motor on the tender car to propel the tender car when the tender car is not coupled with a consist.

11. The method of claim 10, wherein generating the supply of electric power includes generating the electric power during a previous operation of the tender car.

12. The method of claim 11, wherein the previous operation is a dynamic braking operation of the motor.

13. The method of claim 10, further including supplying the auxiliary engine with fuel from the tender car.

14. The method of claim 10, further including receiving manual instructions from an onboard operator station regarding operation of the motor.

15. The method of claim 14, further including receiving remote instructions regarding operation of the motor.

16. The method of claim 10, further including directing electric power from the consist to the motor when the tender car is coupled with the consist.

17. The method of claim 16, further including using the electric power to supplement tractive power from a locomotive of the consist when the tender car is coupled with the consist.

* * * * *